Dec. 23, 1969  J. E. HEMPHILL  3,485,476
BUTTERFLY VALVE
Filed Sept. 19, 1966

INVENTOR
JAMES E. HEMPHILL
BY Bair, Freeman & Molinare
ATTORNEYS

United States Patent Office 3,485,476
Patented Dec. 23, 1969

3,485,476
BUTTERFLY VALVE
James E. Hemphill, Marshalltown, Iowa, assignor to
Fisher Governor Company, a corporation of Iowa
Filed Sept. 19, 1966, Ser. No. 580,228
Int. Cl. F16k 1/12, 5/04, 1/22
U.S. Cl. 251—283                              10 Claims

ABSTRACT OF THE DISCLOSURE

A butterfly valve having a symmetrical valve disc provided with a fin configuration extending from both sides thereof adjacent a peripheral edge portion on one side of the rotational axis of the valve disc and opposite the streamlined nose portion of the valve disc for reducing the hydrodynamic torque on the valve disc so as to reduce the torque necessary to position the valve disc within the flow passage in the valve housing.

Background of the invention

This invention relates in general to butterfly valves and more particularly to an improved butterfly valve disc for reducing the hydrodynamic torque necessary to position a butterfly valve disc within a butterfly valve housing.

Butterfly valves have long been known and are normally used for one of two basic services; either (1) for closure or on-off control valves or (2) for flow rate control or governing. Generally, butterfly valve discs have been formed from a flat planar disc-like member having two sides generally disposed in planar relationship, one with respect to the other, and being generally symmetrical about a transverse plane through the butterfly valve disc. Other valve discs have tapered uniformly from an enlarged center portion to the edge portions thereof. In standard usage, shaft means were secured within bore means extending diametrically through the valve disc for permitting mounting of a valve disc within a valve housing.

The hydrodynamic force acting on the valve discs of the conventional type, as noted above, is generally high and therefore a relatively large manual or motive means is required to position the valve disc in use.

An object of the present invention is to provide an improved butterfly valve incorporating a novel butterfly valve disc for markedly reducing the hydrodynamic torque acting on the valve disc during use and thereby reducing the torque needed to position the butterfly valve disc.

Another object of this invention is to provide an improved butterfly valve including a valve disc having a peripheral sealing edge complementary to the configuration of the flow passage in the valve housing, the valve disc being defined by front and rear surfaces converging in one direction from an enlarged central portion toward an edge portion remote therefrom, and converging in an opposite direction from the enlarged central portion toward an opposed edge portion to adjacent the opposed edge portion and then diverging substantially to the opposed edge portion to form fin means, the improved valve disc functioning to reduce the torque necessary to position the valve disc.

Yet another object of the present invention is to provide an improved butterfly valve disc having fishtail means defined thereon at one peripheral edge portion remote from the rotational axis of the valve disc. Other objects and advantages of the present invention will become more apparent hereinafter.

Brief description of the drawing

The specific details of a presently preferred embodiment of the invention, and their mode of functioning will be particularly pointed out in clear, concise and exact terms in conjunction with the accompanying drawing, wherein.

Description of a presently preferred embodiment of the present invention

Figure 1:
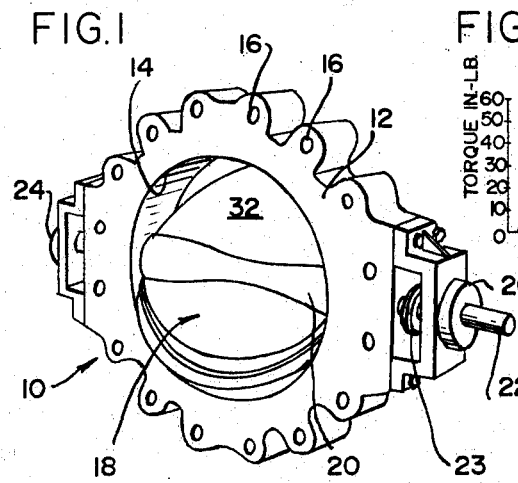
FIG. 1 is a rear perspective view of a butterfly valve embodying the improved valve disc of the present invention.

Referring to FIG. 1, there is illustrated a butterfly valve 10 incorporating the principles of the present invention. The butterfly valve 10 comprises a valve ring or body 12 having a flow passage 14 extending therethrough. A plurality of openings 16 disposed generally circularly about the flow passage are provided within the valve ring 12 to permit securement of the valve ring 12 within the piping of a fluid system.

The butterfly valve disc 18 of the present invention is rotatably supported in the housing or body 12 within the flow passage 14 for controlling the fluid flow through the flow passage. The valve disc 18 includes a central hub portion 20 having an opening therein for receiving a shaft 22 which supports and journals the valve disc 18 for rotation in the housing 12. The disc 18 is complementary to the configuration of the flow passage 14. As shown, the axis of rotation of valve disc 18 extends transverse to the flow passage and is disposed generally horizontally. Suitable packing means 23 are provided at each end of the shaft for preventing leakage about the shaft and between the openings provided in the housing 12 for receiving the shaft. As seen in FIG. 1, separate bearings 24 and 26 may be provided for journaling the shaft with respect to the housing 12. It will be obvious to those skilled in the art that separate bearing means may be provided as shown in FIG. 1, or if desired, the bearings can be incorporated integrally with the housing 12. As shown, the bearings 24 and 26 would not come in contact with any process fluid flowing through the flow passage 14.

The disc 18 is suitably secured to the shaft 22 for rotation therewith.

Before considering the specific details of the valve shown in FIGS. 2–5, first consider the components of the total torque necessary to position the butterfly valve disc in a given butterfly valve. The total torque necessary is equal to the sum of the hydrostatic torque, the bearing toque, the disc weight torque, seating torque, hydrodynamic torque, and other additional very minor torques. The hydrostatic torque may be defined as that torque due to fluid pressure acting behind a closed disc resulting in a force at a point which does not coincide with the axis of the disc shaft.

Reactive forces in the shaft bearing produce, through bearing friction, a bearing torque which is proportional to the resultant force on the valve disc. Being a result of friction, bearing torque opposes motion and is positive or negative depending on whether the valve is being opened or closed. A torque that tends to close the butterfly valve is defined as positive and a torque that tends to open the valve is defined as negative. In the case of the closed valve, the bearing force and the pull-out bearing torque can be calculated. For other valve disc positions, the bearing torque must be determined directly by experimental torque measurement of a sample valve, or indirectly from fluid pressure distribution measurements about the valve disc.

A disc weight torque will occur when the location of the center of gravity of the disc and the disc shaft axis do not coincide.

Seating friction torque results from the friction of the peripheral sealing edge of the disc against the valve seat and acts to oppose rotation.

The resultant hydrodynamic force on the disc produces a torque which varies with the position of the disc with respect to the flow passage. Hydrodynamic torque may be measured directly by experiment or indirectly from the experimentally measured pressure distribution on the disc. The hydrodynamic torque of conventional butterfly valves is positive, but for different disc shapes or disc shaft locations, the hydrodynamic torque may be either positive or negative depending upon the disc position. Hydrodynamic torque varies as the cube of the disc diameter. Further, hydrodynamic torque is directly proportional to the square of the fluid flow or to the pressure drop across the valve disc. For relatively thin discs, peak hydrodynamic torque occurs at around 70° disc opening. As disc thickness increases, the peak hydrodynamic torque occurs at smaller disc angles of opening.

Additional torques may be present in a butterfly valve because of packing friction and disc hub friction at the valve seat. These torques are very minor.

The present invention is concerned primarily with decreasing the hydrodynamic torque. It has unexpectedly been found that a marked reduction in hydrodynamic torque may be attained by providing a butterfly valve disc with a converging streamlined nose portion adjacent a peripheral edge thereof and a fishtail fin arrangement adjacent the opposed peripheral edge thereof remote from the rotational axis of the valve disc. As seen in FIGS. 2–5, the generally circular valve disc member 18 includes front and rear surfaces 30 and 32 respectively which converge from the central portion of the valve disc 18 toward the hemispherical perimetric sealing edge 34 of the valve disc remote from the axis of the bore 36 defined in the hub portion 20. Preferably, the front and rear surfaces converge uniformly to the flattened perimetric edge 34. The hemispherical sealing surface 34 engages with and cooperates with the complementary seating surface defined on the walls of the body 12 forming the flow passage 14. The seating surface within the body 12 may be defined by a suitably machined surface of the body ring 12 or, if desired, a separate seating member may be provided within the body 12. For example, a suitable liner made of a rubber or rubber-like material such as a butadiene-acrylonitrile copolymer or polychloroprene, may be retained in the valve body or a refractory lining can be cast into the butterfly valve body if the butterfly valve is to be used for handling vapors such as hot flue gas, preheated combustion air, or hot blast furnace gases. The specific construction of the liner or of the sealing surface provides no part of the present invention.

The front and rear surfaces 30 and 32 respectively of the valve disc 18 also converge from the central portion toward the peripheral sealing edge 38 of the valve disc opposite from the peripheral edge 34. However, in the regions adjacent the sealing edge 38 and indicated generally by the numerals 40 and 42 (FIG. 5), the front and rear wall portions diverge outwardly (surfaces 30a and 32a, respectively) and then inwardly (surfaces 30b and 32b, respectively) to the sealing edge 38 so as to define fin-like projections 44 and 46 which extend outwardly from the valve disc 18. The hemispherical sealing edge 34 and 38 form a substantially continuous sealing surface (except for the shaft openings provided in the diametrically extending hub portion) that is complementary in configuration to the flow passage and the sealing surface cooperates with the wall defining the passage through valve body 12 to seal the flow passage.

Figure 5:
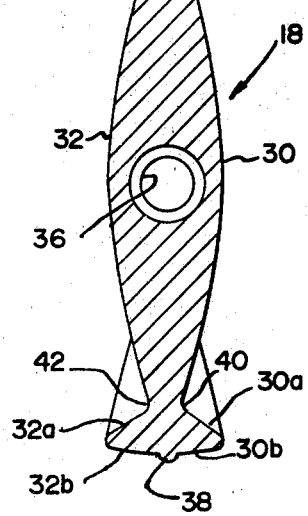
FIG. 5 is a cross-sectional view of the valve disc of FIG. 2 taken generally along the line 5—5 of FIG. 2.

An important feature of the invention is the fishtail configuration of the disc as best seen in FIG. 5. The size and shape of the appended fin affect both the hydrodynamic torque and the flow capacity of the valve. The configuration shown produces a substantial torque reduction with only a slight decrease in flow capacity. The converging surfaces on the front and rear of the valve disc join with the diverging wall portions 30a and 32a in a relatively small radius as indicated generally at 40 and 42. It has been determined experimentally that such a radius results in sizeable torque reduction while maintaining valve capacity. Other configurations will not yield as superior results.

The height of the fin has been found to be an important consideration in minimizing the torque to position the valve disc. The ratio of the fin height to hub thickness will vary with the aspect ratio (aspect ratio is defined as the ratio of valve disc diameter to thickness of the disc measured at the hub) of the disc. Optimum fin height will vary from about ⅓ hub thickness (for thick discs) to heights slightly greater than ½ hub thickness (for thin discs). It is recognized that reasonable variation in fin size and shape will still result in an improved torque/flow ratio when compared with a conventional disc.

Holes 21 may be formed in hub portion 20 if taper pins are used to join the disc 18 and the shaft 22. The holes 21 would be aligned with holes in shaft 22 and the taper pins would be fixed in the aligned holes.

By way of example but not by way of limitation, in one presently preferred embodiment of the invention utilizing a valve disc eight inches in diameter, the maximum width of the disc is about 1.8 inches and the width of the sealing surfaces 34 and 38 is about 3/16 of an inch. The radius of curvature in the areas between the joinder of the converging portions of the front and rear surfaces 30 and 32, respectively, and the diverging portions 30a and 32a of the front and rear surfaces in the area indicated generally at 40 and 42 is 1/32 of an inch.

Figure 4:
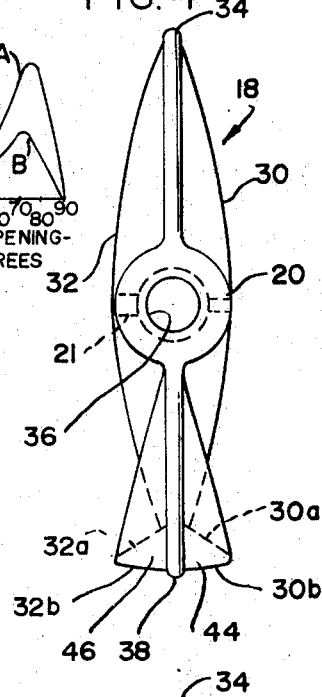
FIG. 4 is an end view of the valve disc of FIG. 2.
Figure 2:
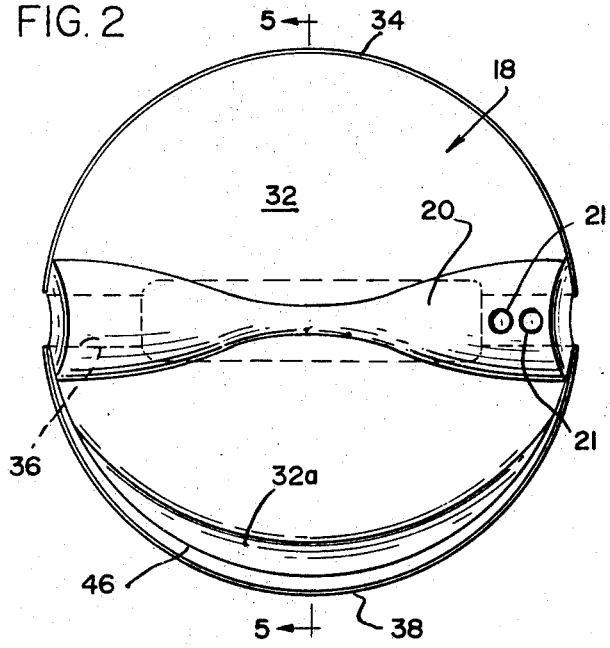
FIG. 2 is a rear view of an improved butterfly valve disc.
Figure 3:
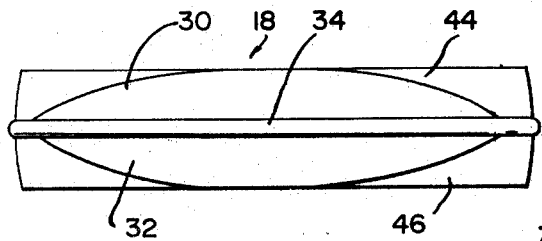
FIG. 3 is a top view of the valve disc of FIG. 2.

As best seen in FIGS. 3, 4 and 5 the valve disc 18 is generally symmetrical on both sides of a plane passing through the edges 34 and 38 of the valve disc 18 and the axis of the bore 36. The front and rear walls 30 and 32 of the valve disc 18 taper substantially uniformly on each side of the central plane through the disc 18 from the central portion of the valve disc in the region of the hub portion 20. As seen in FIG. 4, the walls or surfaces 30 and 32 converge toward the edge 34. The walls 30 and 32 converge downwardly and then wall portions 30a and 30b converge outwardly. Portions 30b and 32b define an undercut at either side of edge 38 to minimize sealing friction and to accommodate disc expansion for high temperature butterfly valve applications.

In use, it is intended that when the central plane of the valve disc 18 (that is, the plane through the axis of the bore means and the peripheral edges 34 and 38) is generally parallel to the planar surfaces defined at the ends of the valve body 12, fluid flow through the passage 14 will be stopped. The shaft 22 will be normally rotated clockwise as viewed in FIG. 1 to permit opening of the flow passage to fluid flow, that is, the edge 34 will be moved toward the direction of fluid flow and the fishtail fin means on the disc will be moved in the opposite direction.

Figure 6:
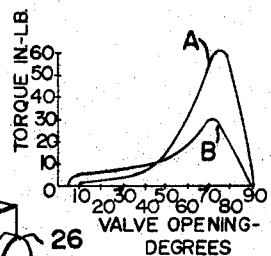
FIG. 6 is a graph comparing a conventional valve disc with the improved valve disc of the present invention, with the X-axis representing degrees of valve opening and the Y-axis representing dynamic torque in inch-pounds.

Referring now to FIG. 6, there is shown a graph of valve opening in degrees plotted against the dynamic torque in inch pounds. The valve opening is along the X axis and the dynamic torque is along the Y axis. The graph compiles data of comparable valve discs four inches in diameter and shows, in curve A, the curve for a conventional flat circular butterfly valve disc and, in curve B, the curve of a valve disc embodying the principles of the present invention. As seen in curve A, in the flat circular butterfly valve disc there is an initial low value of torque which rises rapidly to a sharp peak value (approximately 60 in.-lb.) at a valve opening of about 75°. The torque level then rapidly falls to zero at 90°, or wide open position of the valve disc. It will be appreciated that as the hub thickness of the valve disc increases, the peak torque will occur at smaller angles of valve opening. For a given valve disc diameter, a thin valve disc will have a higher peak torque than a thicker valve disc. The dynamic torque of a conventional disc is in a positive direction, that is, it tends to cause the valve disc to close.

Curve B shows the torque characteristic of a fishtail circular butterfly valve disc having fin means thereon in accordance with the principles of the present invention. A comparison shows that the dynamic torque of the novel disc of the present invention is about 30% to 50% that of the conventional disc at various angles of opening. The peak torque of curve B occurs at about 75° of valve opening, but the peak of curve B is much flatter than that of curve A. The peak torque (approximately 28.5 in.-lb.) of curve B (the torque at about 75° of valve opening) is less than the torque of curve A at a 60° opening.

Valve discs of other aspect ratios require a somewhat different cross-sectional shape, but are generally similar to the fishtail disc configuration illustrated in the drawing. Discs of a specified aspect ratio, but of different diameters, differ by a scale factor, that is, the discs are geometrically similar.

By the present invention, the configuration of conventional butterfly valve discs has been modified to provide a fishtail-type valve disc construction as viewed in transverse cross section, which fishtail construction results in a lower dynamic torque for the valve disc as compared with conventional disc-type valves. In tests of current comparable valve discs embodying the present invention and conventional valve discs of the flat type, reductions in dynamic torque of 30% to 50% have been noted for varying valve positions. As will be appreciated, the significant reductions in dynamic torque obtainable by utilizing an improved butterfly valve disc embodying the principles of the present invention will permit utilization of smaller motors or power means for positioning the valve disc in a butterfly valve. In larger sized butterfly valves, it will be appreciated that material reductions in size and savings in cost mechanism may be effected.

I claim:

1. An improved butterfly valve disc adapted to be rotated within the flow passage in a valve housing about an elongated axis extending through opposed peripheral edges of the valve disc, said valve disc defined by first and second surfaces converging in one direction from an enlarged central portion toward an edge portion remote therefrom to form a nose portion, and converging in an opposite direction from the enlarged central portion toward an opposed edge portion to adjacent the opposed edge portion and then diverging substantially from both sides to said opposed edge portion so as to form fin means on the valve disc, the valve disc being substantially symmetric when viewed in cross-section at right angles to the plane extending through said elongated axis to the peripheral edge of the valve disc, whereby the nose portion of the valve disc is movable in the direction of fluid flow and the fin means is movable in the opposite direction for reducing the torque for positioning the valve disc.

2. In a butterfly valve comprising a housing having a flow passage therethrough, a valve disc rotatably supported in said flow passage in said housing for controlling the flow of fluid through the flow passage, said valve disc having a forwardly converging nose portion, shaft means journaling said valve disc in said housing for rotation about an axis disposed transverse to the direction of flow through the flow passage, characterized by the valve disc having symmetrical fin means diverging outwardly from both sides defined adjacent the edge thereof opposite said nose portion by means of front and rear surfaces of the valve disc that converge toward one another to an area adjacent an edge portion of the valve disc and then diverge outwardly from one another substantially to the edge portion.

3. A butterfly valve as in claim 2 wherein the front and rear surfaces of the valve disc converge uniformly toward one another generally away from the rotational axis of the valve disc and then diverge substantially uniformly in opposite directions for defining the fin means on the valve disc.

4. A butterfly valve as in claim 2 wherein the fin means extend from each side of a central plane through the valve disc a distance equal to about one third to one half the thickness of the valve disc at the central portion thereof.

5. A butterfly valve as in claim 2 wherein said edge portion is defined by surfaces that converge toward one another generally remote from the rotational axis of the valve disc to form a generally hemispherical perimetric sealing surface which cooperates with the means defining the flow passage in the housing to control flow of fluid through the passage.

6. A butterfly valve as in claim 2 wherein the fin means extends circumferentially about 180° on the valve disc.

7. In a butterfly valve comprising a housing having a flow passage therethrough, a valve disc rotatably supported in said housing for controlling flow of fluid through said flow passage, shaft means for journaling said valve disc in said housing for rotation about an axis disposed generally horizontal and transverse to the direction of flow through the flow passage, characterized by the valve disc being complementary in configuration to the flow passage and having a peripheral sealing edge for cooperating with the means in the housing defining the flow passage to close the flow passage to fluid flow, the valve disc being symmetrical about a central plane through the axis of the shaft means and said sealing edge, the front and rear surfaces of the valve disc converging from the central portion of the valve disc toward one edge thereof to form a nose portion on the valve disc and the front and rear surfaces of the valve disc converging from said central portion of the valve disc toward the opposite edge thereof to adjacent said opposite edge, and then diverging outwardly to form fin means on the valve disc for reducing the hydrodynamic torque required to position the valve disc.

8. A butterfly valve as in claim 7 wherein the flow passage is circular and the valve disc is circular.

9. A butterfly valve as in claim 7 wherein the valve disc has bore means therein and said valve disc includes a hub portion extending centrally thereof, the bore means being defined in the hub portion and the height of the fin means from a central plane through the valve disc varying from about one-third to one-half the maximum thickness of the hub portion.

10. A butterfly valve as in claim 9 wherein said one end of the valve disc is streamlined and said other end of the valve disc has said fin means thereon, said valve disc being movable between a valve closing position generally in a plane at a right angle to the direction of flow through said flow passage and a valve opening position generally at an angle with respect to said right angle plane, said streamlined one end being movable upstream into the path of fluid flow.

References Cited

UNITED STATES PATENTS

| | | | |
|---|---|---|---|
| 2,095,263 | 10/1937 | Moss | 251—305 X |
| 2,271,390 | 1/1942 | Dodson | 251—305 X |
| 3,049,335 | 8/1962 | Daumy et al. | 251—305 |
| 3,141,470 | 7/1964 | La Fontaine | 251—305 X |
| 3,143,132 | 8/1964 | Pangburn | 251—306 X |
| 3,176,704 | 4/1965 | De Palma | 251—305 X |

FOREIGN PATENTS

| | | |
|---|---|---|
| 759,325 | 11/1933 | France. |
| 1,233,654 | 5/1960 | France. |
| 30,566 | 1888 | Canada. |

OTHER REFERENCES

Resumé of British application 30,197/66, published January 1968, copy in 251—305.

HENRY T. KLINKSIEK, Primary Examiner

U.S. Cl. X.R.

251—305